June 30, 1925.                J. F. BEMIES                1,543,977
UNIVERSAL COUPLING
Filed June 1, 1922                2 Sheets-Sheet 2
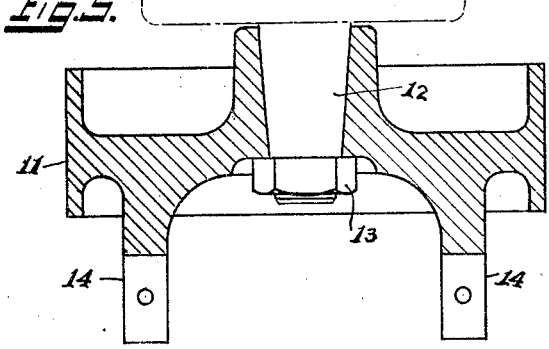
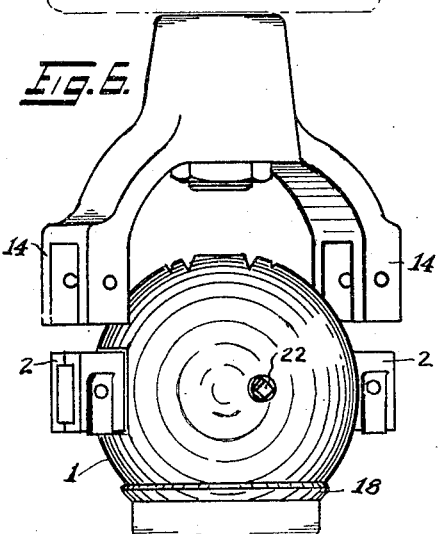
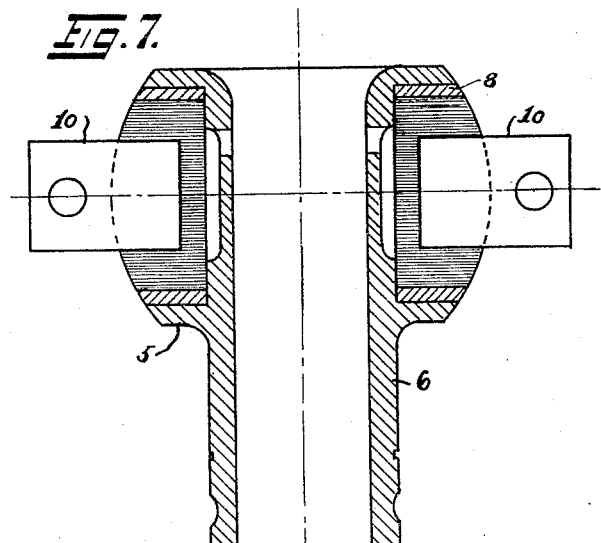
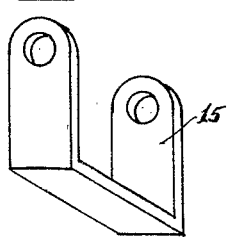
James F. Bemies, INVENTOR.
BY
F.H.Richard, ATTORNEY.

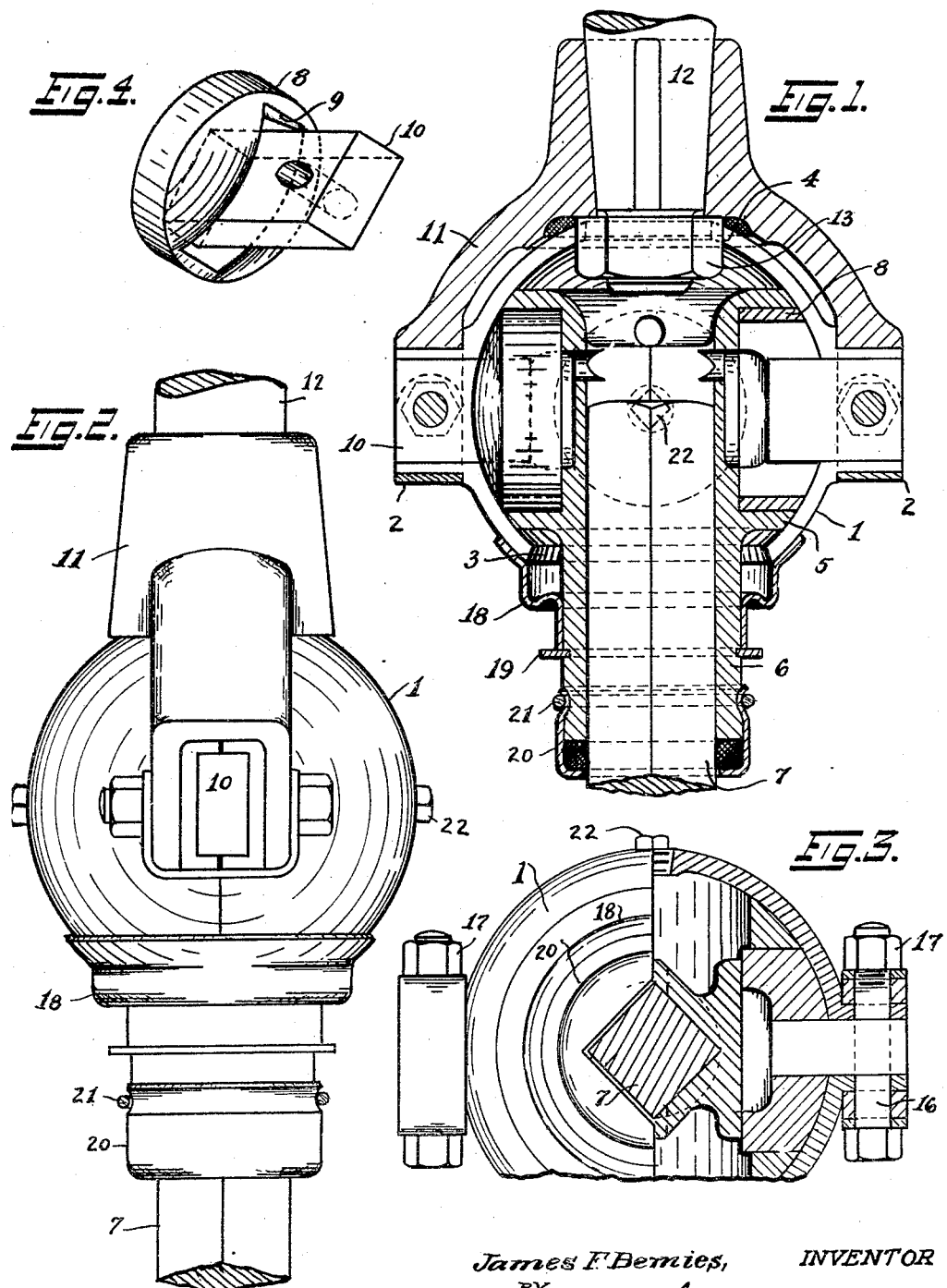

Patented June 30, 1925.

1,543,977

UNITED STATES PATENT OFFICE.

JAMES F. BEMIES, OF BROOKLYN, NEW YORK.

UNIVERSAL COUPLING.

Application filed June 1, 1922. Serial No. 565,151.

*To all whom it may concern:*

Be it known that I, JAMES F. BEMIES, a citizen of the United States, residing at Brooklyn, in the county of Kings and State of New York, have invented certain new and useful Improvements in Universal Couplings, of which the following is a specification.

The present invention relates to improvements in universal joints, the object of the invention being to provide a joint of this character which is comparatively simple in construction, and of great strength and durability.

A further object of the invention is to provide a universal joint of the ball and socket type in which practically all of the wear will be borne by the pivot members, while the socket or shell member will be subjected to practically no friction.

With the foregoing and other objects in view, which will appear as the description proceeds, the invention consists in the novel features of construction and combination of parts which will be more fully described hereinafter and particularly pointed out in the claims.

In the drawings accompanying and forming part of this specification:

Figure 1 is a central longitudinal section through the device in assembled condition;

Fig. 2 is a side elevation of the assembled device;

Fig. 3 is a partly sectional end view;

Fig. 4 is a detail perspective view of one pivot member and its cooperating key;

Fig. 5 is a transverse section of the yoke for connecting the device with a driving shaft, said yoke being modified by having a brake-flange arranged thereon;

Fig. 6 is a perspective view illustrating the yoke and universal joint separated;

Fig. 7 is a central longitudinal section through the ball member of the joint; and Fig. 8 is a perspective view of one of the reinforcing clamps for embracing the connecting portions of the yoke and shell.

The same characters of reference designate the same parts in the different figures of the drawings.

Referring to the drawings, 1 designates a spherical shell or housing divided along its center line into two equal parts, each of which is provided at diametrically opposite points with a pair of laterally extending perforated lugs or ears 2 of channel formation at their inner sides, whereby when the two halves of the shell are brought together a laterally extending rectangular opening is formed between the lugs at each side of the shell, as clearly shown at the left side of Fig. 6, for the reception of a key to be hereinafter described. Each of the semi-spherical portions of the shell is further provided at diametrically opposite points and at right angles to its lugs, with a pair of semi-circular recesses 3 and 4, the recess 3 being considerably larger than the recess 4, these recesses forming, when the halves of the shell are brought together, a pair of circular openings in axial alinement with each other. A truncated ball member 5 is housed within the shell, and is provided with a stem 6 extending therefrom through the larger opening 3 and preferably having a square bore for the reception of the end of a shaft 7. The opening 3 in the shell is of considerably larger diameter than the stem of the ball, whereby the stem is free to change its angular position with relation to the axis of the shell. The ball 5 is provided at diametrically opposite sides with a pair of circular recesses for the reception of a pair of pivot members or trunnions 8, which fit said recesses sufficiently loosely to permit rotation therein. The trunnions are formed at their outer sides with curved convex surfaces conforming to the curvature of the ball and are each provided with a transversely extending slot or keyway 9 for the reception of a perforated key 10, the slot being considerably larger than the width of the key thereby to permit movement of the trunnion relatively to the key in a plane transverse to the pivotal axis of the trunnion.

A yoke 11 is provided for securing the universal or driving shaft 12, which may be splined to the sleeve of the yoke as shown in Fig. 1, the end of the shaft and said sleeve being slightly tapered and a nut 13 threaded on the inner end of said shaft and engaging a shoulder formed in the yoke for maintaining the shaft in tight engagement with the sleeve. The yoke is provided at the ends of its shell-engaging arms with a pair of perforated bifurcated portions 14 for embracing the lugs 2 of the shell. A U-shaped clamp 15 having a perforation in each of its legs adapted to register, when assembled, with the perforations in the bifurcated ends 14 of the yoke and with the perforations in the ears 2 of the shell and in the keys 10, is provided for each bifurcated end of the yoke.

The joint is assembled in the following manner:

The trunnions are placed in the recesses of the ball with the slots 9 parallel with the stem 6 of the ball. The ball is then placed within one of the semispherical portions of the shell and the other semispherical portion placed over said ball, whereupon the keys 10 are inserted into the openings formed in the lugs 2 and pushed inwardly until their perforations register with those of the lugs. The keys are of such a length that they extend a considerable distance into the slots of the trunnions, thereby locking the shell and ball for rotation together. The bifurcated ends of the yoke are then slipped over the lugs 2 and their perforations made to register with those of the lugs. When in this position the extreme inner end of the shaft 12 and the nut 13, carried thereby, extend within the shell through the opening 4. The clamps 15 are slipped over the said bifurcated ends to the side of the lugs opposite from the yoke, the openings in the legs of the clamps being also made to register with those in the lugs. A bolt 16 is then passed through all of said perforations and secured therein by means of a nut 17. The device is now fully assembled and ready for operation.

In order to prevent dirt from entering the shell, a suitable cap 18 is carried by the stem 6 of the ball member, having an enlarged portion adapted to cover the opening 3 of the shell in all positions of the stem, said cap being held against movement away from the shell by means of a collar or washer 19 shrunk into an annular groove formed in the stem 6. A spring cap 20 is also provided for covering the end of the stem 6 where the shaft 7 enters the same, said cap having near its inner end an annular depression adapted to "take" into a similar depression in the stem and held therein by means of a ring 21 sprung over the end of the cap. The shell is provided with any suitable number of openings closed by screw plugs 22 for permitting lubrication in the usual manner.

From the foregoing it will be seen that I have provided a universal joint which, while comparatively simple in construction, is of great strength and very efficient in operation, and in which practically all of the wear that occurs will be between the trunnions 8 and the keys 10, since the friction produced by the angular movements of the ball in one direction is borne entirely by the trunnions and their recesses in the ball, while the friction produced by the angular movements in the direction transversely of said first direction is borne entirely by the keys and the slots in the trunnions.

While I have described in detail the structure herein illustrated, it is to be understood that I do not thereby limit my invention to the precise features of the construction shown, as I am aware that many mechanical changes and modifications may be made therein without departing from the spirit and scope of the claims hereto appended.

Having thus described my invention, what I claim is:

1. A universal joint, comprising, in combination, a pair of complementary shell forming members each having a pair of laterally extending channel portions adapted to form when assembled a pair of openings in the wall of the shell, a ball member adapted to be enclosed within said shell and movable angularly with relation to the axis of the shell, a pair of pivot members carried by said ball member adjacent to said openings, a pair of keys removably carried in said openings and extending into said pivot members, said ball member being movable relatively to said keys in a plane transverse to the axes of its pivot members, and means for removably securing the shell members together.

2. A universal joint, comprising, in combination, a pair of complementary shell forming members each having a pair of laterally extending channel portions adapted to form when assembled a pair of openings in the wall of the shell, a ball member adapted to be enclosed within said shell and movable angularly with relation to the axis of the shell, a pair of pivot members carried by said ball member and provided with elongated slots extending transversely of their pivotal axes, a pair of keys removably carried in the wall openings of the shell and extending into said slots, the width of the keys being less than the length of the slots whereby the ball member is movable relatively to said keys in a plane transverse to the axes of its pivot members, and means for securing the shell members together.

3. A universal joint, comprising, in combination, a pair of complementary shell forming members each having a pair of laterally extending members adapted to form when assembled a pair of diametrically opposite openings in the wall of the shell, a ball member adapted to be enclosed within said shell, said ball and shell having, one a pair of pivot members, and the other a pair of keys secured thereto and extending to said pivot members, said pivot members being movable relatively to said keys in a plane transverse to their pivotal axes, a yoke engaging the laterally extending members of the shell, and fastening means for securing said yoke and laterally extending members together.

4. In combination, a shaft; a yoke fast on said shaft; a housing seated in said yoke and provided with an outer opening and with diametrically opposite socket openings; an inner member fitting in said housing for universal movement and provided with opposite recesses; and means engaging in said openings and recesses forming a driving connection between said housing and inner member.

5. In combination, a driving shaft; a yoke fast on said shaft provided with arms having bifurcated ends; a spherical housing between said arms and provided with diametrically laterally extending rectangular lugs seated fast in said ends and each provided with a socket opening passing therethrough; an inner ball member fitting in said housing for universal movement and provided with recesses; and means engaging in said openings and recesses forming a driving connection between said housing and inner member.

6. In combination, a shaft; a yoke fast on said shaft; a spherical housing on said yoke and provided with an outer opening and with diametrically opposite socket openings of annular cross-section; said housing being divided into hemispherical shells by a plane of parting passing axially through said lugs in the plane of the yoke; an inner member fitting in said housing for universal movement and provided with opposite recesses; and means engaging in said openings and recesses forming a driving connection between said housing and inner member.

7. In combination, a rotary member; a housing on said member; a ball member fitting in said housing for universal movement and provided with opposite recesses; journals in said recesses retained by said housing and each provided with a key-way; and keys fast in said housing and slidably engaging said key-ways.

8. In combination, a rotary member; a spherical housing on said member; a ball member fitting in said housing for universal movement and provided with opposite recesses; journals in said recesses each provided with a key-way closed at the ends; and keys fast in said housing slidably fitting in said key-ways.

9. In combination, a rotary member; a spherical housing on said member and provided with diametrically opposite socket openings; a ball member fitting in said housing for universal movement and provided with opposite recesses and a stem; journals in said recesses each provided with a key-way and having an unbroken bearing periphery; and keys fast in said housing slidably fitting in said key-ways.

10. In combination, a rotary member; a split spherical housing on said member provided with diametrically opposite socket openings; a ball member fitting in said housing for universal movement and provided with opposite recesses and a stem; disk-shaped journals retained in said recesses by said housing each provided with a key-way; and keys fast in said socket openings and slidably fitting in said key-ways.

11. In combination, a yoke having bifurcated ends; a housing between said arms and provided with an outer axial opening, laterally extending lugs fast in said ends and each having a socket opening; a ball member fitting in said housing for limited universal movement and provided with circular recesses; journals in said recesses; and keys fast in said socket openings and engaging said journals.

12. In combination, a yoke; a spherical housing fast on said yoke provided with lateral lugs each provided with a socket opening of angular cross-section passing therethrough; said housing being divided by a plane passing longitudinally through said lugs; a ball member fitting in said housing for limited universal movement and provided with recesses; journals fitting in said recesses; and keys of angular cross-section fast in said socket openings and connected to said journals.

13. In combination, a yoke provided with a pair of seats; a spherical housing provided with diametrically laterally extending rectangular lugs seated fast in said seats and each provided with a socket opening of angular cross-section passing therethrough; a ball member fitting in said housing for limited universal movement and provided with diametrically opposite lateral recesses; journals fitting in said recesses and each provided with a key-way; and keys of rectangular cross-section fast in said socket openings and engaging in said key-way.

14. In combination, a shaft; a yoke fast on said shaft provided with a pair of seats; a spherical housing between said arms and provided with an outer axial opening and also with diametrically laterally extending rectangular lugs seated fast in said seats and each provided with a socket opening or angular cross-section passing therethrough; a ball member fitting in said housing for limited universal movement and provided with diametrically opposite lateral circular recess, and an axial stem extending through said outer opening; journals fitting in said recesses and each provided with a key-way; keys of rectangular cross-section fast in said rectangular openings and engaging in said key-way; and bolts passed through said ends, lugs and keys.

15. In combination, a shaft; a yoke fast on said shaft provided with a pair of seats; a housing provided with diametrically laterally extending rectangular lugs disposed in said seats and each provided with a socket opening of angular cross-section passing therethrough; said housing being divided into hemispherical shells by a plane passing longitudinally through said lugs; a ball member fitting in said housing for limited universal movement and provided with diametrically opposite lateral circular recesses; journals fitting in said recesses and each provided with a key-way; keys of rectangular cross-section fast in said rectangular openings and engaging in said key; clamp clasping said lugs; and bolts passed through said ends, clamp, lugs and keys.

16. In combination, a shaft; a yoke fast on said shaft; a nut on the end of said shaft for holding the yoke in place; a spherical housing fast between said arms and provided with an inner axial opening receiving said nut; a ball member fitting in said housing for limited universal movement and provided with a cut-out loosely receiving said nut; and a driving connection between said ball member and housing.

17. In combination, a driving shaft; a yoke fast on said shaft provided with arms; a nut on the end of said shaft for holding the yoke in place; a spherical housing fast between said arms and provided with an inner axial opening receiving said nut; a ball member fitting in said housing for limited universal movement; and a driving connection between said ball member and housing.

18. In combination, a rotary member; a spherical housing on said member and provided with an outer opening and lateral openings; a ball member fitting in said housing for universal movement and provided with lateral recesses and an axial stem extending through said outer opening; and means engaging in said lateral openings and recesses forming a driving connection between said housing and inner member.

JAMES F. BEMIES.

Witnesses:
H. D. PENNEY,
ACHILLES ROVEGNO.